July 2, 1963
H. MAHN
3,095,750
CONTROL MECHANISM FOR THE AXIAL DISPLACEMENT OF COMPONENTS OF PHOTOGRAPHIC OR CINEMATOGRAPHIC OBJECTIVES AND THE LIKE
Filed Dec. 6, 1960
2 Sheets-Sheet 1
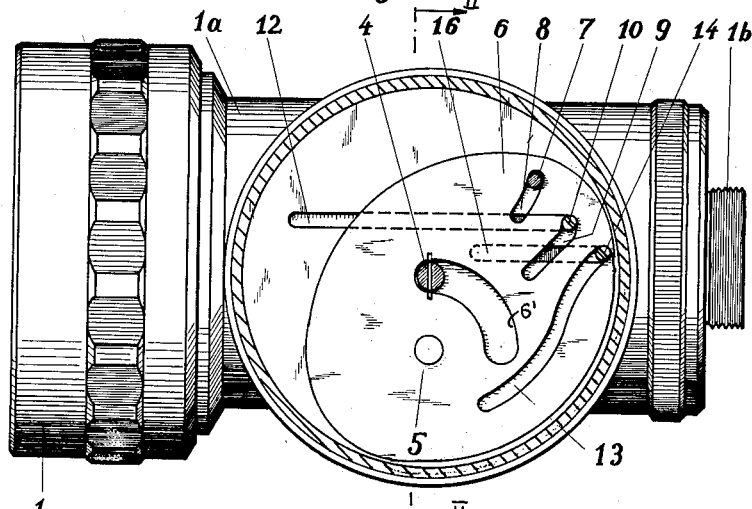
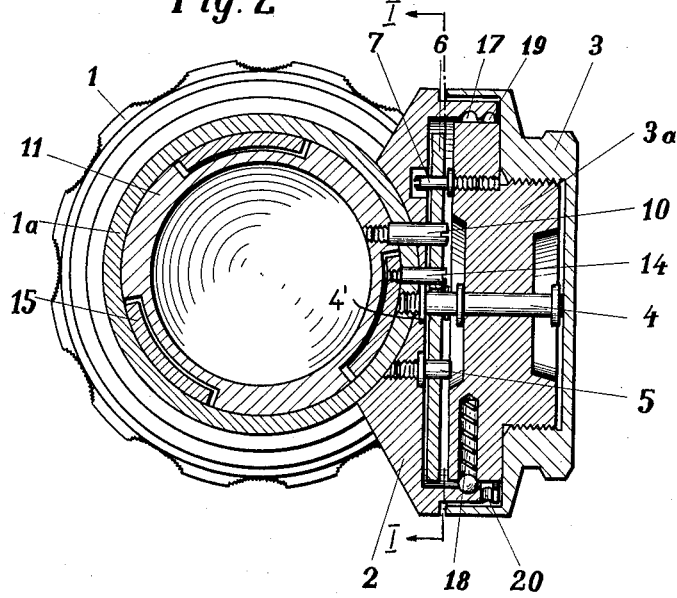
INVENTOR:
Herbert Mahn
BY
*Karl T. Ror*
AGENT July 2, 1963 H. MAHN 3,095,750
CONTROL MECHANISM FOR THE AXIAL DISPLACEMENT OF COMPONENTS
OF PHOTOGRAPHIC OR CINEMATOGRAPHIC OBJECTIVES AND THE LIKE
Filed Dec. 6, 1960 2 Sheets-Sheet 2
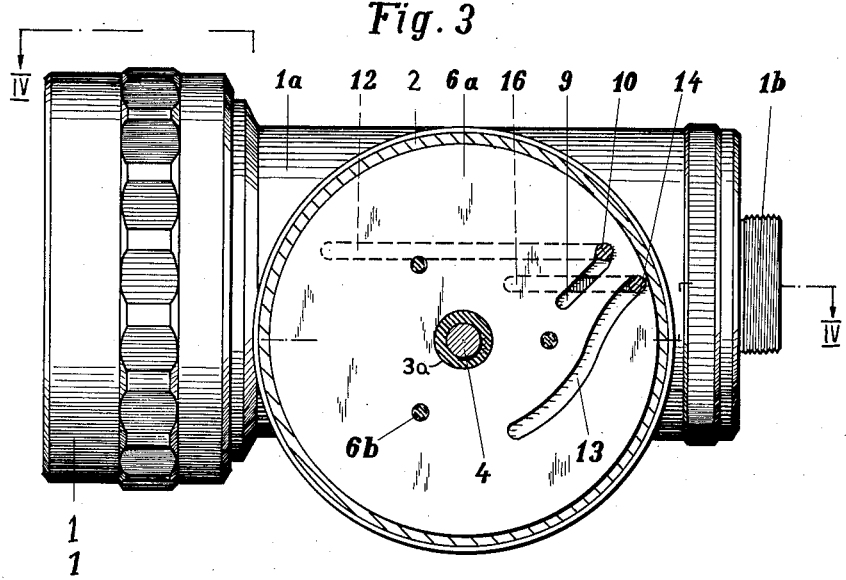
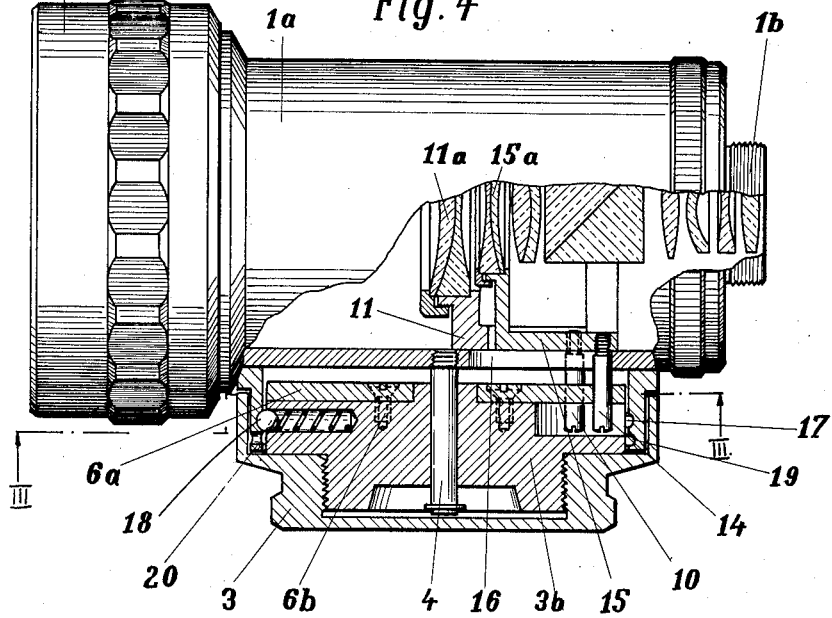
INVENTOR:
Herbert Mahn
BY
Karl F. Ross
AGENT

United States Patent Office 3,095,750
Patented July 2, 1963

3,095,750
CONTROL MECHANISM FOR THE AXIAL DISPLACEMENT OF COMPONENTS OF PHOTOGRAPHIC OR CINEMATOGRAPHIC OBJECTIVES AND THE LIKE
Herbert Mahn, Kreuznach, Germany, assignor to Optische Werke Jos. Schneider & Co., Kreuznach, Germany, a corporation of Germany
Filed Dec. 6, 1960, Ser. No. 74,118
Claims priority, application Germany Dec. 12, 1959
9 Claims. (Cl. 74—107)

My present invention relates to a mechanism for axially displacing one or more components of an optional system, such as that of a photographic or cinematographic camera.

The axial displacement of lens members or other components of optical systems for focusing purposes can be effected by a variety of mechanisms. Where the displacement must bear a predetermined relationship with the concurrent motion of another element, such mechanisms have heretobefore been rather unwieldy, space-consuming and of complex construction. This is particularly true of varifocal systems in which two or more components are simultaneously displaceable for changes in the focal length of the system without a shifting of its image plane.

It is an object of my present invention to provide an improved and simplified mechanism for the controlled axial displacement of a component of an optical system.

More particularly, the invention aims at providing such mechanism for the joint control of a plurality of components of a varifocal objective.

In accordance with this invention there is provided a control member mounted for displacement in a plane parallel to the optical axis of the system, this member having one or more camming surfaces located in said plane and co-operating with respective components of the system to effect their axial displacement. For this purpose the control member is supported on a suitable mounting, generally a part of the objective housing, which forms a corresponding number of fixed guiding surfaces extending parallel to the optical axis to control the motion of the movable optical components, through the intermediary of suitable cam followers (e.g. pins) rigidly secured thereto, jointly with the aforesaid camming surfaces. The control member is preferably a rotatable disk having slots whose boundaries constitute the camming surfaces, these slots inclinedly intersecting with slots in the objective housing defining the guiding surfaces referred to above. The axis of rotation of the disk need not intersect the optical axis of the system but may be skew thereto, the latter arrangement being often desirable for greater compactness.

Rotation of the disk about its axis may be conveniently carried out by a knob projecting laterally from the objective housing. This knob may be rigid with the control disk or, for greater flexibility of design, may be coupled therewith through suitable transmission means. Though any conventional transmission (e.g. racks or pinions) could be used for this purpose, I prefer to utilize a pin-and-slot coupling similar to that which controls the axial displacement of the movable components; in that case the setting knob for the control disk may be rotatable about a pivot parallel to but offset from that of the disk.

A particular advantage of a mechanism according to this invention resides in the fact that the disk (or equivalent control member) may be readily exchanged for another having different camming surfaces whereby the law of displacement of the controlled components may be varied at will.

The invention, in accordance with a more specific feature, also provides means for selectively indexing the displaceable component or components in different positions of adjustment. This is conveniently accomplished by a transverse shift of the control member into a position in which a yieldable detent coupled with it becomes effective to engage a co-operating recess in the stationary support thereof, or vice versa.

The invention will be described in greater detail with reference to the accompanying drawing in which:

FIG. 1 is a side-elevational view of a camera objective provided with control mechanism according to the invention, the latter being shown in section taken on line I—I of FIG. 2;

FIG. 2 is a cross-sectional view taken on line II—II of FIG. 1;

FIG. 3 is a view similar to FIG. 1, with a modified control mechanism shown in section taken on line III—III of FIG. 4; and FIG. 4 is a top view of the assembly of FIG. 3, shown partly in section taken on line IV—IV thereof.

The system shown in FIGS. 1 and 2 comprises an objective housing 1 with a rearward extension 1a forming a cylindrical lens mount; the latter terminates in a threaded male coupling 1b for attachment to the body of a camera not shown.

Fixedly secured to the lens mount 1a is a cup-shaped support 2 for a knob 3 which threadedly engages a generally cylindrical holder 3a rotatable about a stud 4. This pin is threadedly secured to the housing extension 1a for ready removal therefrom upon the dis-assembling of elements 3 and 3a. Stud 4 has a shoulder 4' which, together with other fastening means (not shown), detachably secures the support 2 to the housing.

A pin 5, threaded into the support 2, serves as a fulcrum for a control disk 6 of non-circular configuration. An arcuate slot 6' in disk 6, concentric with its pivot 5, is traversed by the stud 4 to allow for a swinging of the disk through an angle of about 90°. Disk 6 is also provided with a coupling slot 8, traversed by a pin 7 projecting from holder 3a, and with two camming slots 9, 13 respectively receiving pins 10 and 11 which extend outwardly from the objective housing through axially oriented guide slots 12 and 16.

The optical components of the objective, not illustrated in FIGS. 1 and 2 but visible in FIG. 4, include two negative lens members 11a and 15a carried on independently slidable mounts 11 and 15, respectively. Pins 10 and 14 are respectively threaded into lens mounts 11 and 15 to control the displacement of components 11a and 15a in conformity with the shape of the camming slots 9 and 13; this displacement, which may be in the same sense or in mutually opposite directions, serves to vary the focal length of the objective while maintaining the projected image sharply focused upon a film or other photosensitive surface in the camera body, as is well known per se. It will be readily apparent that rotation of the knob 3 about its pivotal axis represented by stud 4 entrains the control disk 6 to bring about such displacement.

The inner wall surface of body 2 is provided with two parallel peripheral grooves 17 and 19 of which the latter communicates with a plurality of angularly spaced radial recesses 20 (only one shown) adapted partly to receive a ball check 18 lodged in holder 3a. This ball check, urged outwardly by a spring 21, normally rests in the inner groove 17 to enable continuous adjusting rotation of knob 3. When it is desired to index the varifocal system at a selected setting, the knob assembly 3, 3a is pulled outwardly on stud 4 until the ball check 18 falls into the groove 19 and, after suitable rotary adjustment, enters the recess 20 corresponding to the chosen position.

In the modified system of FIGS. 3 and 4, in which like reference numbers have been used to denote corresponding parts, the eccentrically pivoted control disk 6 of FIGS. 1 and 2 has been replaced by a disk 6a rotatable about the stud 4 serving as a fulcrum for knob 3. In this simplified arrangement the disk 6a, which of course lacks the coupling slot 8 of disk 6, has been attached directly to the rotatable holder 3b of knob 3 by screws 6b.

In both illustrated embodiments the control disk 6 or 6a may readily be exchanged for one having differently shaped camming slots, such substitution being made possible by the detachability of the knob assembly 3, 3a, or 3, 3b and its pivotal stud 4. The transmission ratio between knob 3 and the controlled components 11a, 15a may similarly be varied; in the system of FIGS. 1 and 2, through the selection of disks 6 with different coupling slots 8.

The invention is, of course, not limited to the specific embodiments described and illustrated, but may be realized in various modifications without departing from the spirit and scope of the appended claims.

I claim:

1. A control mechanism for an optical system having at least one component displaceable along the optical axis of the system, comprising a housing for said system, a stud on said housing extending generally transversely to said axis, a knob rotatable on said stud with freedom of displacement thereon between a first and a second axial location, co-operating indexing means on said housing and said knob effective in said first axial location for yieldably arresting the latter in a selected one of several angular positions, said indexing means being ineffectual in said second axial location, an axially fixed disk disposed adjacent said knob in a plane transverse to said stud and rotatable in said plane, said housing being provided with a guiding slot extending parallel to said axis, said disk being provided with a camming slot inclinedly intersecting said guiding slot, a pin on said movable component extending outwardly from said housing through said guide and camming slots, and coupling means connecting said disk with said knob for joint rotation.

2. A control mechanism according to claim 1 wherein said housing has a cup-shaped portion surrounding said disk and said knob, said portion being provided with a first and a second annular groove spaced in axial direction of said knob, said indexing means including a spring-pressed ball check on said knob engaging said first and second grooves in said first and second axial locations, respectively, said first groove being provided with a radial recess at each of said angular positions.

3. A control mechanism for an optical system having a plurality of components independently displaceable along the optical axis of the system, comprising a housing for said system, a stud on said housing extending generally transversely to said axis, a knob rotatable on said stud with freedom of displacement thereon between a first and a second axial location, co-operating indexing means on said housing and said knob effective in said first axial location for yieldably arresting the latter in a selected one of several angular positions, said indexing means being ineffectual in said second axial location, an axially fixed disk disposed adjacent said knob in a plane transverse to said stud and rotatable in said plane, said housing being provided with a plurality of guiding slots extending parallel to said axis, said disk being provided with a plurality of camming slots inclinedly intersecting said guiding slots, respectively, a pin on each of said movable components extending outwardly from said housing through a respective guide slot and a respective camming slot, and coupling means connecting said disk with said knob for joint rotation.

4. A control mechanism for an optical system having at least one component displaceable along the optical axis of the system, comprising a housing for said system, a stud on said housing extending generally transversely to said axis, a knob rotatable on said stud with freedom of displacement thereon between a first and a second axial location, co-operating indexing means on said housing and said knob effective in said first axial location for yieldably arresting the latter in a selected one of several angular positions, said indexing means being ineffectual in said second axial location, an axially fixed disk disposed adjacent said knob in a plane transverse to said stud and rotatable in said plane about a pivot offset from said stud, said housing being provided with a guiding slot extending parallel to said axis, said disk being provided with a camming slot inclinedly intersecting said guiding slot, a pin on said movable component extending outwardly from said housing through said guide and camming slots, and coupling means connecting said disk with said knob for joint rotation about said pivot and said stud, respectively.

5. A control mechanism for an optical system having a plurality of components independently displaceable along the optical axis of the system, comprising a housing for said system, a stud on said housing extending generally transversely to said axis, a knob rotatable on said stud with freedom of displacement thereon between a first and a second axial location, co-operating indexing means on said housing and said knob effective in said first axial location for yieldably arresting the latter in a selected one of several angular positions, said indexing means being ineffectual in said second axial location, an axially fixed disk disposed adjacent said knob in a plane transverse to said stud and rotatable in said plane about a pivot offset from said stud, said housing being provided with a plurality of guiding slots extending parallel to said axis, said disk being provided with a plurality of camming slots inclinedly intersecting said guiding slots, respectively, a pin on each of said movable components extending outwardly from said housing through a respective guide slot and a respective camming slot, and coupling means connecting said disk with said knob for joint rotation about said pivot and said stud, respectively.

6. A control mechanism for an optical system having at least one component displaceable along the optical axis of the system, comprising a housing for said system, a pair of parallel studs on said housing extending generally transversely to said axis, a disk member rotatable on one of said studs, a knob member rotatable on the other of said studs, said housing being provided with a guiding slot extending parallel to said axis, said disk member being provided with a camming slot inclinedly intersecting said guide slot, a pin on said movable component extending outwardly from said housing through said guide and camming slots, and coupling means interconnecting said members for joint rotation about said studs, respectively.

7. A control mechanism according to claim 6 wherein said coupling means comprises a pin on one of said members, the other of said members being provided with a coupling slot engaged by said pin.

8. A control mechanism for an optical system having a plurality of components independently displaceable along the optical axis of the system, comprising a housing for said system, a pair of parallel studs on said housing extending generally transversely to said axis, a disk member rotatable on one of said studs, a knob member rotatable on the other end of said studs, said housing being provided with a plurality of guiding slots extending parallel to said axis, said disk member being provided with a plurality of camming slots inclinedly intersecting said guiding slots, respectively, a pin on each of said movable components extending outwardly from said housing through a respective guide slot and a respective camming slot, and coupling means interconnecting said members for joint rotation about said studs, respectively.

9. A control mechanism according to claim 8 wherein said coupling means comprises a pin on said knob member, said disk member being provided with a coupling slot engaged by said pin.

References Cited in the file of this patent

UNITED STATES PATENTS

| | | |
|---|---|---|
| 2,095,100 | Maillard | Oct. 5, 1937 |
| 2,493,463 | Morgan et al. | Jan. 3, 1950 |
| 2,937,535 | Wezner | May 24, 1960 |
| 2,983,209 | Werner | May 9, 1961 |

FOREIGN PATENTS

| | | |
|---|---|---|
| 643,094 | Germany | Mar. 24, 1937 |